US006886902B2

(12) United States Patent
Scardovi

(10) Patent No.: US 6,886,902 B2
(45) Date of Patent: May 3, 2005

(54) INK JET PRINTING SYSTEM AND METHOD FOR CONTROLLING THE PRINTING QUALITY

(75) Inventor: Alessandro Scardovi, Ivrea (IT)

(73) Assignee: Olivetti Tecnost S.p.A. (IT)

( * ) Notice: Subject to any disclaimer, the term of this patent is extended or adjusted under 35 U.S.C. 154(b) by 126 days.

(21) Appl. No.: 10/332,488

(22) PCT Filed: Jul. 9, 2001

(86) PCT No.: PCT/IT01/00360

§ 371 (c)(1), (2), (4) Date: Jan. 9, 2003

(87) PCT Pub. No.: WO02/04220

PCT Pub. Date: Jan. 17, 2002

(65) Prior Publication Data

US 2004/0090481 A1 May 13, 2004

(30) Foreign Application Priority Data

Jul. 10, 2000 (IT) .................................... TO2000A0688

(51) Int. Cl.[7] ........................ B41J 29/393; H04N 1/405
(52) U.S. Cl. ......................................... 347/19; 358/3.12
(58) Field of Search .................... 347/14, 19; 358/3.12, 358/3.21, 3.24, 302, 406, 504

(56) References Cited

U.S. PATENT DOCUMENTS 4,680,645 A 7/1987 Dispoto et al.
5,387,976 A 2/1995 Lesniak
5,473,351 A 12/1995 Helterline et al.
6,154,227 A * 11/2000 Lund ........................... 347/14
6,431,679 B1 * 8/2002 Li et al. ........................ 347/19

FOREIGN PATENT DOCUMENTS

EP 0625847 A 11/1994
EP 0747224 A 12/1996
EP 0921007 A 6/1999

* cited by examiner

*Primary Examiner*—Thinh Nguyen
*Assistant Examiner*—Julian D. Huffman
(74) *Attorney, Agent, or Firm*—Banner & Witcoff, Ltd.

(57) ABSTRACT

This invention relates to an ink jet system (10) and to a corresponding method of use suitable for rendering the printing characteristics homogeneous upon changes in working conditions, such as the type of printing medium, inks and ambient conditions. The object is attained through optical means (24) suitable for detecting the quantity of light reflected by appropriate patterns and a control unit (21) suitable for processing the data corresponding to the quantity of light reflected in order to identify the real dimensions of the ink droplets (dot size) on the printing medium and for transmitting them to the print management programs or print drivers (67*b*). The system (10) and method guarantee total independence from the working conditions, with the result that the images printed will be uniform no matter what the conditions.

8 Claims, 3 Drawing Sheets

INK JET PRINTING SYSTEM AND METHOD FOR CONTROLLING THE PRINTING QUALITY

This is a U.S. National Phase Application Under 35 USC 371 and applicant herewith claims the benefit of priority of PCT/IT01/00360 filed on Jul. 9, 2001, which was published Under PCT Article 21(2) in English, and of Application No. TO2000A000688 filed in Italy on Jul. 10, 2000.

TECHNICAL FIELD

This invention relates to an ink jet printing system comprising printing equipment suitable for printing images of given characteristics and a print driver suitable for controlling the characteristics of the printing equipment, depending on the size of the drops of ink on the medium, and to the relative method for controlling the printing quality.

More particularly the invention relates to a system and method for rendering the printing characteristics of printing equipment homogeneous in the presence of changing working conditions.

BACKGROUND ART

Printing systems are known in the art, such as for instance printers, photocopiers, fax machines, etc., that are suitable for producing the printout of a document by means of ink jet printing devices in the form of fixed or interchangeable printheads.

The composition and operating mode of an ink jet printing system are widely known to those acquainted with the art and a detailed description of one will not therefore be provided herein, but solely of some of the characteristics that are important for the understanding of this invention.

A typical jet printing system consists of:

1] Printing equipment comprising:

- a device for feeding and advancing a sheet of paper or other material (print medium) on which it is desired to print the image in such a way that the feeding takes place in a given direction in discrete steps (line feed);
- a movable carriage sliding on guideways in a direction perpendicular to that of feeding of the sheet, actuated selectively by a motor so as to effect a forward motion and a return motion across the width of the sheet;
- a printing device, for example a removable printhead, attached to the carriage, comprising multiple emission resistors deposited on a substrate (generally a plate of silicon) and arranged inside cells full of ink having corresponding nozzles, through which the head can emit droplets of ink having a given volume;
- an electronic printing controller (print controller), connected to an electronic processor (computer), for exchanging information concerning printing data and settings and suitable for selectively controlling feeding of the sheet, movement of the carriage and activation of the printhead through the selective heating of the resistors and the emission of the ink droplets against the surface of the sheet; and 2] A print management or print control software

- this software, generally installed on the computer, cooperates with the print controller and is suitable for processing the original image to convert its original chromatic data into corresponding chromatic data for printing.

In particular, the print driver is a program suitable for converting data relative to images and/or texts from a format generally made up of three distinct information planes R, G and B (Red, Green and Blue) for additive type systems, for instance cathode ray tubes, into a like number of distinct information planes C, M, Y and K (Cyan, Magenta, Yellow and Black) for subtractive type systems, for example printing systems.

The conversion of each image dot (pixel) from the RGB planes to the CMY and K planes, as is known, must take into account the level of intensity attributed to each pixel, a level which, as it is currently defined using 8 bits, may assume any binary value within a range of 256 intensity levels.

As is known, in order to also keep the intensity information in the conversion from RGB to CMY and K, the print driver associates a "superpixel" with each pixel consisting, for example, of a 16*16 dot matrix, representing the corresponding level of intensity to be obtained in the printing stage; accordingly, for example, 256 superpixels each representing a given intensity are associated by the print driver with the range of 256 levels of the pixel of one of the RGB planes.

As is known, each superpixel comprises white dots, representing the points at which not to eject ink, and black dots, representing the points at which to eject ink, and theoretically the number of black dots linearly corresponds to the level of intensity of the pixel; in practice, however, the print driver modifies the distribution of white and black dots in the superpixels on the basis of two correction factors:

- the type of sheet or printing medium;
- the print dot size.

In actual fact, as can be understood by intuition, for like superpixels, the optical effect changes with changes in the type of medium and changes in the dot size.

One technical problem, common to all the ink jet printing systems, is that in order to keep the printing characteristics or quality constant, understood as repeatability of the optical sensation generated by the printed document, it is necessary, for like type media, for the print driver to use the "real" dot size; this is not however easy to obtain as it is subject to percentage variations, even large scale, on account of the following factors:

- In the case of printing systems using replaceable heads, the dot size is subject to variations because the volume of the drops ejected changes from head to head on account of the manufacturing spreads of the heads;
- The dot size, moreover, is influenced by temperature of the surrounding environment as this conditions efficiency of the head and therefore the volume of the drops ejected;
- The dot size, for like droplet volumes, is highly dependent on the type of printing medium and on changes in its characteristics since both the medium type and its characteristics can produce a different extension of the drops on the medium;
- Finally, the dot size, in the sense of the ways the droplets penetrate the printing medium, is influenced by the ambient humidity and by the humidity absorbed by the medium.

Since, as already stated earlier, it is precisely the dot size that print drivers use in order to process the image to be printed and obtain constant printing results over time, the known art tries to overcome the above-mentioned problems in many different ways:

- By using heads whose "droplet volume" data is stored in the factory in an appropriate memory on board the head. This technique, as well as not completely resolving the problem, is also expensive and suitable for implementation only on highly complex printing systems;

By producing print drivers dependent on the type of printing medium. In this case, the user must inform the driver which family of printing medium type he is using (plain paper, coated paper, glazed paper, photographic, transparency) so as to take into account the different dot size obtained from the same droplet volume. However even in the same family of media, there exist significant differences in dot size, and even between different production lots of the same type of medium, so that this method too only partially solves the problem described.

Naturally, if the print driver uses a dot size different from the "real" size to "correct" the superpixels and, as a result, the image, the printing characteristics obtained are in fact different each time as the operating conditions change.

In the known art, therefore, to overcome the problem described above the trend is to implement "typical" configuration values, in terms of printing medium and dot size, on the print drivers, accepting variations of the quality when the operating conditions do not correspond to the "typical" values. Unfortunately however, the known art does not indicate sure devices and methods with which to obtain constant printing quality and accordingly either a quality that is dependent on the operating conditions is accepted or more expensive and sophisticated printing technologies are used when the printing quality must necessarily be constant, as for instance in biomedical applications.

DISCLOSURE OF THE INVENTION

The object of this invention is to produce an ink jet printing system and corresponding method with which the real dot size may be identified and variations therein kept under control and compensated in such a way as to obtain printing characteristics that remain constant with changes, generally, of the working conditions and, in particular, of the heads, media types, inks and environmental conditions.

This object is achieved by the printing system as described in claim 1 and the printing method as described in claim 5.

With the method according to the invention, it is possible to operate in such a way that, as the working conditions changes, i.e. new head, new media supply, different humidity and temperature, calibration of the printing equipment may be performed so that the new dot size is calculated and transmitted to the print driver in order to maintain constant printing quality.

In accordance with further characteristics of this invention, the methodology may be fully automatic, via the use of appropriate optical sensors applied on the printhead, or manual, thereby leaving the user the possibility of assessing dot size on the basis of the optical sensation perceived from the reading of an appropriate pattern.

BRIEF DESCRIPTION OF DRAWINGS

These and other characteristics of the invention will become clear from the following description of a preferred embodiment, provided by way of a nonrestrictive example with the aid of the accompanying diagrams, wherein.

BEST MODE FOR CARRYING OUT THE INVENTION

Figure 1:
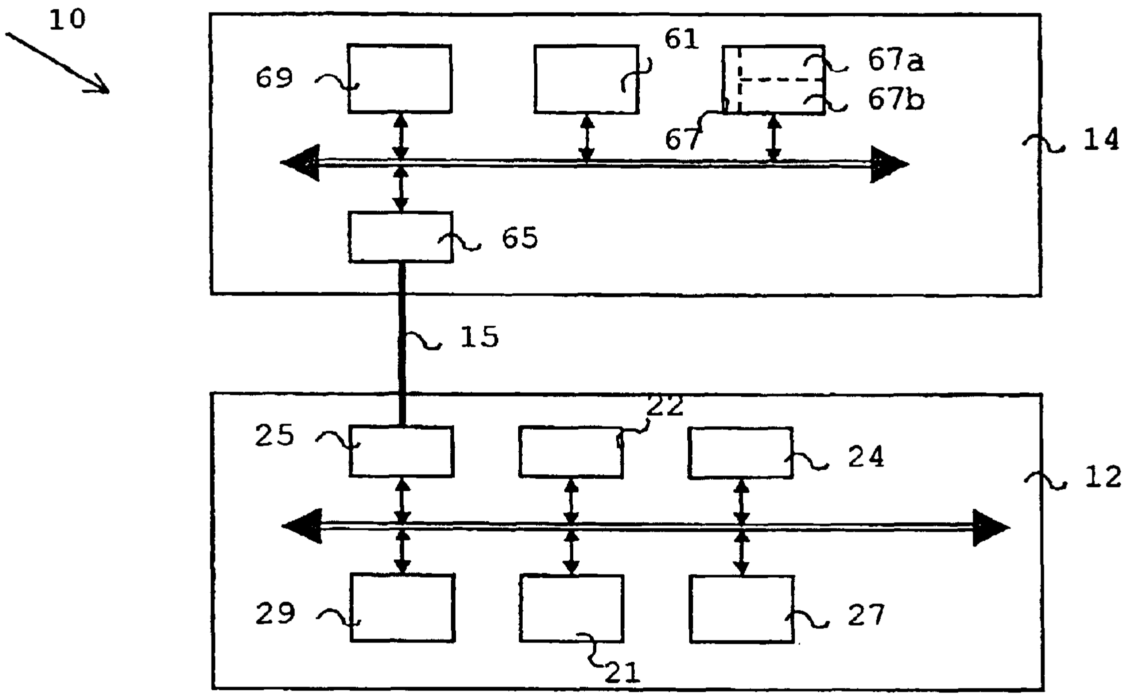
FIG. 1 is a block diagram of a printing system according to the invention.

With reference to FIG. 1, the printing system 10 according to this invention comprises printing equipment 12, suitable for printing texts and/or images on various types of media, and a computer 14, for example a personal computer or PC, suitable for processing, with appropriate programs, the printing data, texts or images, and transmitting this processed data to the printing equipment 12 by means of a connecting cable 15, a parallel cable for instance.

The printing equipment 12 comprises a print controller 21, an ink jet printhead 22, of known type, an optical device 24, of known type, connected to the print controller 21 and controlled by the latter.

The printing equipment 12 also comprises an interface device 25, of known type, for instance of the parallel type, connected to the cable 15 and to the print controller 21 and suitable for transmitting data and parameters to the computer 14, a random access memory (printer RAM) 27, of known type, suitable for storing, under the control of the print controller 21, the information processed by the computer 14 and transmitted by the latter to the printing equipment 12, and a read only memory (printer ROM) 29, of known type, suitable for storing data, for example calibration patterns, and programs developed in the design stages of the printing equipment 12.

The printhead 22, for example monochromatic or polychromatic, is suitable for selectively ejecting ink through a plurality of nozzles arranged in various columns and set apart in such a way as to obtain a predefined number of "dots per inch" (dpi) or, in metric terms, dots per 25.4 mm, in the printing columns; in addition, the head is suitable for ejecting ink a number of times determined on a unit length of one inch, or in metric terms 25.4 mm; the number of nozzles per column and the number of ejections per unit length are indicative of the overall resolution of the printing equipment 12 and is expressed as a matrix of dots per inch, for example 300*300 dpi, 600*300 dpi, 600*600 dpi and so on, and as is known, is one of the parameters used by the print driver for defining superpixels.

Figure 2:
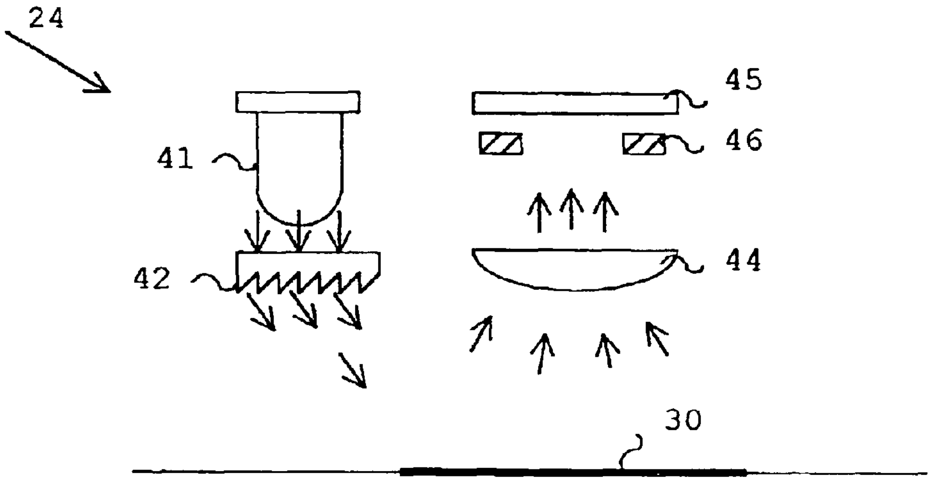
FIG. 2 is a summary diagram of the optical device of the system of FIG. 1.

The optical device 24 (FIG. 1 and FIG. 2) comprises a lighting circuit (LED) 41, for example a LED (Light Emitter Diode), an asymmetrical diffracting member 42, suitable for directing the light emitted by the LED 41 in a predefined direction, a lens 44, of known type, a photoelectric sensor 45, of known type, suitable for detecting the quantity of light and converting it to an electric voltage signal proportional to the quantity of light, and a mask 46, suitable for delimiting the area on which to perform reading of the quantity of light.

The optical device 24 is suitable for detecting the quantity of light reflected by patterns 30 predefined in the design stages and stored for example in the printer ROM 29, as will be described in detail below.

The computer 14 comprises a control unit (CPU) 61, an interface device 65, of known type, for example parallel type, connected to the cable 15 and to the CPU 61, suitable for transmitting data and parameters to the printing equipment 12, and a random access memory (RAM) 67, suitable for storing data and programs; in particular, the RAM 67 is suitable for storing in a first zone 67_a_ data representing images or characters to be processed and printed with the printing equipment 12, and in a second zone 67_b_, programs, for example the print driver, suitable for handling the data stored in the first zone 67_a_ and for supplying it to the printing equipment 12, in a form suitable for printing, by means of the cable 15.

In accordance with a first embodiment of the method according to the invention, the dot size is obtained experimentally as described below.

To start with, a sheet of the type of medium on which to perform the automatic calibration is inserted in the printing equipment 12.

With the printhead 22, and using one of the colours CMY and K, some patterns 30 (FIG. 3) are printed on the sheet with predefined density characteristics or filling factors $K_s$, for example a pattern 30_a_ with density $K_s$=100%, a pattern with density $K_s$=75%, a pattern 30_b_ with density $K_s$=50% and a pattern 30_c_ with density $K_s$=25%.

These patterns are used to calibrate the system and obtain a law for reading the optical device 24 independent of the reflecting power of the medium, of the light intensity, of transparency of the lens 44 and of the response of the photoelectric sensor 45, which differs from device to device and also depends on different environmental factors such as, for example, temperature.

The patterns 30 are of predefined dimensions, for example of 2.5*2.5 or 5*5 or 10*10 or 25*25 mm, generally greater than or equal to the dimensions of the mask 46 (FIG. 2 and FIG. 3) and composed of elementary squares 30_d_ of dimensions sufficiently large, for example of 0.5*0.5 or 1*1 mm, if compared with those of the individual drops of ink.

After the patterns 30 have been printed, they are read back by the optical device 24, the same patterns 30 being selectively illuminated by the LED 41 and the corresponding voltage levels detected by the photoelectric sensor 45.

The voltages thus detected are, for instance, stored in the printer RAM 27 (FIG. 1, FIG. 2, FIG. 3 and FIG. 4) and processed by the printing controller 21 so as to give a curve or table of the voltages measured by the photoelectric sensor 45 depending on the predefined filling factors $K_s$.

Figure 3:
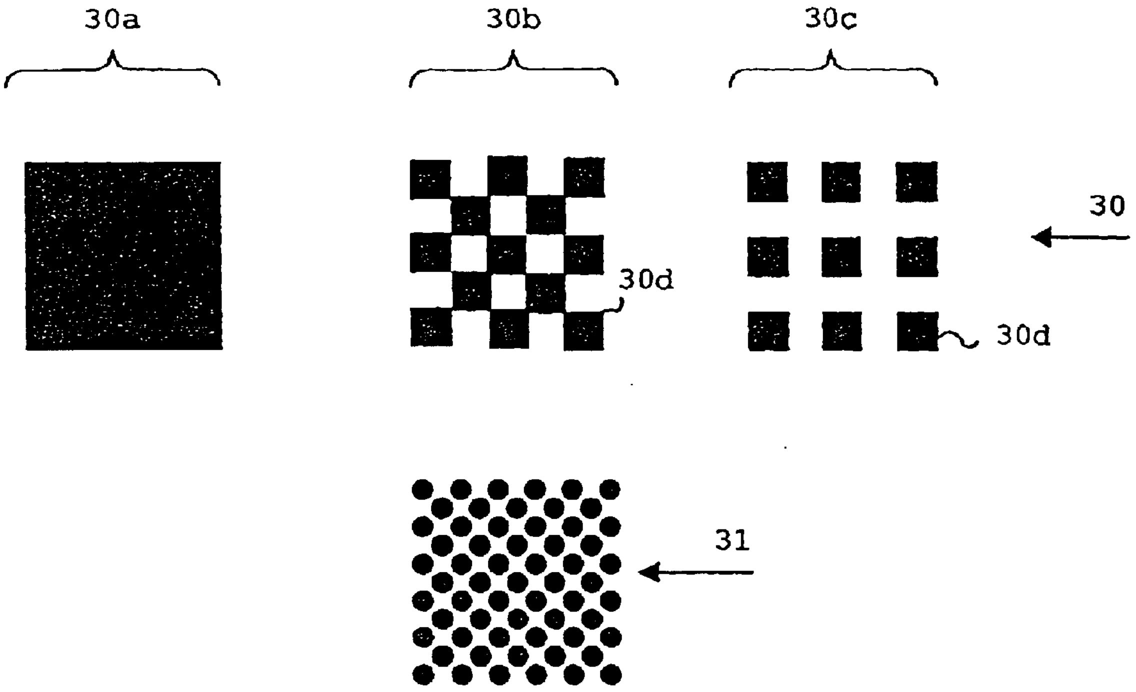
FIG. 3 is a first group of patterns for implementation of the method according to this invention in a first embodiment.

Subsequently or at the same time as the steps described above, an area consisting of a multiplicity of superpixels 31 having a predefined intensity, for example of 50%, is printed on the sheet, for example under the control of the print driver and using "typical" values. The area will have dimensions equivalent to those of the patterns 30. Naturally an enlarged example of superpixel with intensity 50% is illustrated in FIG. 3.

After printing, the printed pattern corresponding to the superpixel 31 is read, and a voltage $V_t$ obtained from the photoelectric sensor 45 which corresponds to the "real" filler factor $K_t$ determined by the "real" dot size.

Figure 4:
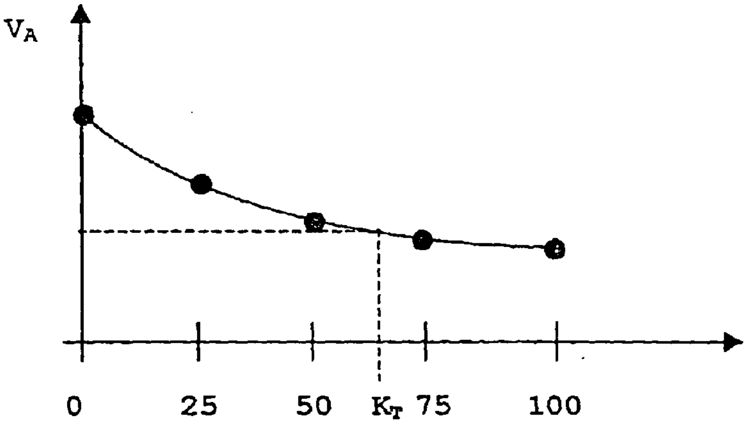
FIG. 4 is an interpolation curve of the measured voltage obtainable with the group of patterns of FIG. 3.

As the area of the pixel $A_p$ corresponding to the superpixel 31 is known, on the basis of the characteristics, in terms of dpi, of the printing equipment 12, the print controller 21, using predefined programs stored in the printer ROM 29, can work out the area of the printed dot $A_d$ using this formula:

1]

$$A_d = A_p * \frac{K_t}{K_s}$$

in which:

$A_p$: Area of a single pixel, known from the characteristics of the printing equipment;

$K_s$: is, as in the example, equal to 50%; and $K_t$: is obtained by interpolation, for example linear, from the curve of FIG. 4 or from a corresponding table.

Having obtained $A_d$ it is now possible to determine dot size D with the following formula:

2]

$$D = \sqrt{\frac{4 * A_d}{\pi}}$$

After performing the above calculations, the print controller 21 is capable of transmitting, by means of the cable 15, the dot size information to the print driver which will adapt its superpixel tables in order to "correct" the information to be printed.

In accordance with the method described above, the printing system 10, using the "real" dot size values is therefore capable of guaranteeing a constant printing quality whenever the working conditions change.

According to a second embodiment of the method of this invention, the dot size is obtained experimentally in the following way.

Figure 5:
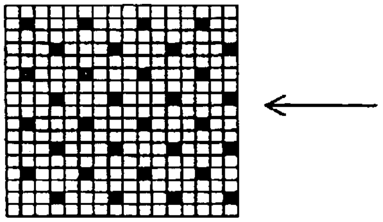
FIG. 5 represents examples of composite patterns for implementation of the method according to this invention in a second embodiment.
Figure 5:
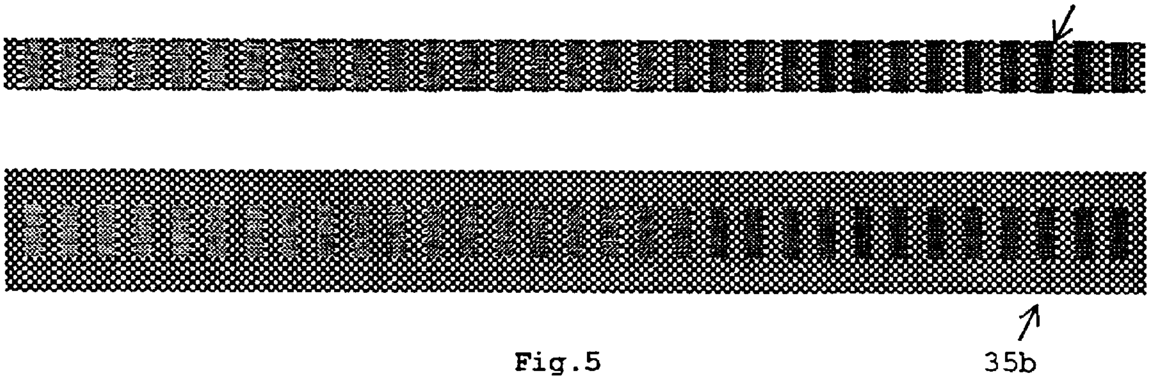

A predefined pattern is taken by way of reference, for example the pattern 30_b_ relative to a filler factor of 50%, and a composite pattern 35 constructed, the pattern 30_b_ (FIG. 1, FIG. 2, FIG. 3, FIG. 5 and FIG. 6) being alternated with a plurality of areas consisting of superpixels having variable levels of intensity in a range close to the density of the reference pattern taken. Depicted in FIG. 5 by way of example is a superpixel 36 of 16*16 dots having a determined intensity.

Figure 6:
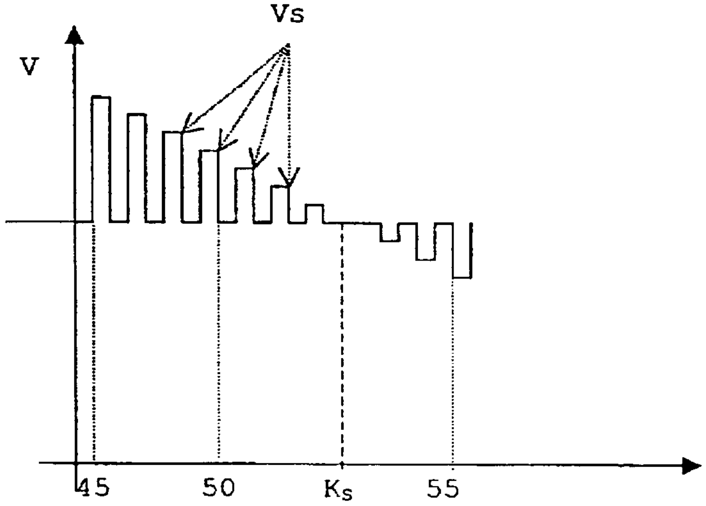
FIG. 6 represents a curve of the measured voltage using the composite patterns of FIG. 5.

The composite pattern 35, for example in the shape 35_a_, is printed with the printhead 22, using one of the colours CMY and K, and read in a similar way to that described and the print controller 21, on the basis of suitable programs stored in the printer ROM 29, obtains a curve illustrated in FIG. 6 or a corresponding table, of the voltages measured by the photoelectric sensor 45, in which for a constant voltage $V_t$ corresponding to the pattern 30_b_ different values of $V_s$ are alternated corresponding to the different intensities given by the different areas of different density.

The level of intensity $L_s$ of the superpixel used to obtain a voltage $V_s$ equal to $V_t$ and corresponding, as in the example, to a filling percentage $K_t$ of 50%, gives, by way of the simple transformation $L_s$*100/256, the filling percentage $K_s$, with which to calculate "real" dot size according to the formula 1] used for the first embodiment.

1]

$$A_d = A_p * \frac{K_t}{K_s}$$

in which, in this case:

$A_p$: is known from the characteristics of the printing equipment;

$K_s$: is the filling percentage of the superpixel which gives an optical effect equivalent to that of the reference pattern; and $K_t$: is, as in the example, 50%.

The diameter is calculated and transmitted to the print driver as in the first embodiment.

It should be remembered that this second embodiment may also be used with a manual calibration operation in which the user prints out the composite pattern, selects the level of superpixel considered most similar to the reference pattern and transmits it to the print driver.

In this case, it is better to use, for instance, the composite pattern 35*b* in which the superpixels of variable intensity are "embedded" in the pattern 30*b* making it more legible.

As those acquainted with the sector art will readily appreciate, in one embodiment the patterns are printed and dot size calculated, for example, with activation provided by means of a button not shown in the figures, suitably prearranged on the printing equipment 12, adapted for commanding the print controller 21 to print the patterns 30, 35*a* or 35*b*, stored for instance in the printer ROM 29, for implementation of the method according to the first and/or second embodiment.

According to a further embodiment, the print driver itself, if suitably programmed, is suitable for commanding the printing equipment 12 for implementation of the method according to the first and/or second embodiment.

In another embodiment in which manual calibration is arranged, the print driver, as will easily be understood by those acquainted with the sector art, is suitable for receiving from a user entry of the parameter corresponding to the filling percentage $K_s$ of the superpixel which optically provides the optical effect equivalent to the filling percentage $K_t$ of the reference pattern. Naturally, in this case, the pattern 35*b* will also contain text type information, not depicted in FIG. 5, indicative of the different intensities of the superpixel or of the filling percentages KS corresponding to the various superpixels.

The method is applicable either by calculating dot size experimentally for one colour and extending the result to the other basic colours or by performing the calculation for all the colours CMY and K.

Where the calibration has to be performed on all the colours CMY and K, the optical device includes, for instance, as those acquainted with the sector art will readily understand, differently coloured LED's that may be activated selectively depending on the colour of the pattern on which it is desired to perform calibration or dot size calculation.

The description provided above may embrace obvious changes or variants in the dimensions, shapes, materials, components, circuitry elements, connections and contacts, in the details of the circuitry and manufacture illustrated, and in the method of operating without departing from the spirit of the invention.

What is claimed is:

1. An ink jet printing system (10) comprising:

printing equipment (12) having a ink jet printhead (22) for printing on a medium via the ejection of droplets of ink;

a print driver (21) associated with said printing equipment (12) and configured both for processing data to be printed on the basis of information indicative of the medium and of the dimensions of the droplets of ink on the medium and for supplying the processed information to the printing equipment (12);

pattern printing means for printing on said medium with said ink jet printhead (22) a plurality of patterns (30, 30*a*, 30*b*, 30*c*) of predefined different densities ($K_s$), in order to obtain corresponding optical effects;

superpixel printing means for printing on said medium with said ink jet printhead (22) an area constituted by at least one typical superpixel (31) having a predefined intensity and being calculated from typical information on the medium and on the printed dot size;

optical analysis means comprising an optical device (24) associated with said printing equipment (12), said optical analysis means being configured for:

reading by said optical device (24) such plurality of printed patterns (30, 30*a*, 30*b*, 30*c*), analyzing the optical signals ($V_A$) generated by said optical device (24) by reading said plurality of printed patterns (30, 30*a*, 30*b*, 30*c*), extrapolating from the analysis of said optical signals corresponding to said printed patterns (30, 30*a*, 30*b*, 30*c*) a characteristic curve indicative of the optical effect of said printed patterns upon changes in the density of said printed patterns (30, 30*a*, 30*b*, 30*c*), reading by said optical device (24) such printed typical superpixel (31), and identifying a real optical density ($K_t$) corresponding to said printed typical superpixel (31), by interpolation of said characteristic curve with the optical signal generated by said optical device (24) by reading said printed typical superpixel (31);

computing means (14) for calculating the real dimensions ($A_d$) of the dot printed on the medium by said real optical density ($K_t$) identified by said optical analysis means; and means for supplying said print driver (21) with said real dimensions ($A_d$) of the dot printed on the medium.

2. The ink jet printing system according to claim 1, wherein said real dimensions ($A_d$) of the dot printed on the medium is calculated by said computing means with the following formula:

$$A_d=A_p*K_t/K_s$$

in which:

$A_d$: real dimensions of the dot printed on the medium, $A_p$: area of a single pixel, known from the characteristics of the printing equipment;

$K_s$: predefined intensity of the typical superpixel; and $K_t$: real optical density, corresponding to the printed typical superpixel, identified by interpolation of the characteristic curve.

3. An ink jet printing system (10) comprising:

printing equipment (12) having an ink jet printhead (22) for printing on a medium via the ejection of droplets of ink;

a print driver (21) associated with said printing equipment (12) and suitable both for processing data to be printed on the basis of information indicative of the medium and of the dimensions of the droplets of ink on the medium, and for supplying the processed information to the printing equipment (12);

pattern printing means for printing on said medium with said ink jet printhead (22) a composite pattern (35, 35*a*, 35*b*) comprising:

a pattern of predefined density ($K_t$); and a plurality of patterns obtained with values typical of the medium and of the printed dot size and representing a corresponding plurality of superpixels of intensity variable about the predefined density ($K_t$) of said pattern of predefined density ($K_t$);

optical analysis means comprising an optical device (24) associated with said printing equipment (12), said optical analysis means being configured for:

reading by said optical device (24) such printed composite pattern (35, 35*a*, 35*b*), analyzing the optical signals (V, $V_t$, $V_s$) generated by said optical device (24) and corresponding to the different patterns of said printed composite pattern (35, 35*a*, 35*b*), and identifying from the analysis of said optical signals (V, $V_t$, $V_s$) a determined superpixel having a determined intensity ($K_s$) and capable of providing an optical effect equivalent to that of said pattern of predefined density ($K_t$); and computing means (14) for computing from the results of the optical analysis performed by said optical analysis means (24) the real dimensions ($A_d$) of the dot printed on the medium, said computing means being suitable for calculating said real dimensions by way of said determined intensity ($K_s$) of said determined superpixel.

4. The ink jet printing system according to claim 3, wherein said real dimensions ($A_d$) of the dot printed on the medium is calculated by said computing means with the following formula:

$$A_d = A_p * K_t / K_s$$

in which:

$A_d$: real dimensions of the dot printed on the medium, $A_p$: area of a single pixel, known from the characteristics of the printing equipment;

$K_s$: intensity or filling percentage of the determined superpixel which gives an optical effect equivalent to that of the reference pattern of predefined density ($K_t$); and $K_t$: predefined density of the reference pattern.

5. The system according to claim 3, wherein in said composite pattern (35*b*) said plurality of patterns, corresponding to a plurality of superpixels of intensity variable, are embedded in said pattern of predefined density ($K_t$).

6. The system according to claim 3, wherein said optical analysis means are configured for identifying said determined superpixel having said determined intensity ($K_s$) by ascertaining equality between one of optical signals ($V_s$), generated by said optical device (24) and corresponding to said plurality of superpixels of intensity variable, and the optical signal ($V_t$) generated by said optical device (24) and corresponding to said pattern of predefined density ($K_t$).

7. A method for controlling the printing quality of a printing system (10) comprising printing equipment (12) having a ink jet printhead (22) for printing on a medium via the ejection of droplets of ink and a print driver (21) associated with said printing equipment (12), said print driver (21) being configured both for processing data to be printed on the basis of information indicative of the medium and of the dimensions of the droplets of ink on the medium and for supplying the processed information to the printing equipment (12), said method comprising the following steps:

printing on said medium with said ink jet printhead (22) a plurality of patterns (30, 30*a*, 30*b*, 30*c*) of predefined different densities ($K_s$) to obtain corresponding optical effects;

optically analyzing the optical density of said plurality of printed patterns;

calculating from the results of said optical analysis the real dimensions of the dot printed on the medium; and supplying said print driver with said real dimensions of the dot printed on the medium, wherein the printing step includes:

printing on said medium with said printhead (22) a typical superpixel (31) having a predefined intensity and being calculated from typical information on the medium and on the printed dot size;

wherein the step of optically analyzing is performed by using an optical device (24) associated with said printing equipment and includes:

extrapolating from the optical analysis of said plurality of printed patterns a characteristics curve indicative of the optical effect upon changes in the density of said patterns;

detecting by said optical device (24) the optical effect of the printed typical superpixel (31); and identifying the optical density ($K_t$) corresponding to said printed typical superpixel (31), by interpolation of said characteristic curve with the detected optical effect of said printed typical superpixel (31); and wherein the calculating step includes using the identified optical density ($K_t$) in order to calculate the real dimensions of the printed dot on the medium.

8. A method for controlling the printing quality of a printing system (10) comprising printing equipment (12) having an ink jet printhead (22) for printing on a medium via the ejection of droplets of ink, and a print driver (21) associated with said printing equipment (12), said print driver (21) being configured both for processing data to be printed on the basis of information indicative of the medium and of the dimensions of the droplets of ink on the medium and for supplying the processed information to the printing equipment (12), said method comprising the following steps:

printing on said medium with said ink jet printhead (22) a plurality of patterns (30, 30*a*, 30*b*, 30*c*) of predefined densities ($K_s$) to obtain corresponding optical effects;

optically analyzing the optical density of said plurality of printed patterns;

calculating from the results of said optical analysis the real dimensions of the dot printed on the medium; and supplying said print driver said real dimensions of the dot printed on the medium, wherein the printing step further includes printing on said medium with said ink jet printhead (22) a composite pattern comprising:

a pattern of predefined density ($K_t$); and a plurality of patterns obtained with values typical of the medium and of the printed dot size and representing a corresponding plurality of superpixels of intensity variable about the predefined density ($K_t$) of said pattern;

wherein the step of optically analyzing comprises identifying a determined superpixel suitable for supplying an optical effect equivalent to the predefined density ($K_t$) of said pattern and having a determined density ($K_s$); and wherein the calculating step comprises using said determined density ($K_s$) of the superpixel for calculating the real dimensions of the printed dot.

* * * * *